(12) United States Patent
Blatchley et al.

(10) Patent No.: US 9,819,063 B2
(45) Date of Patent: Nov. 14, 2017

(54) CLIMATE CONTROL SYSTEM FOR A VEHICLE

(71) Applicant: Ford Global Technologies, LLC, Dearborn, MI (US)

(72) Inventors: Timothy Noah Blatchley, Dearborn, MI (US); Mark G. Smith, Canton, MI (US); Angel Fernando Porras, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 139 days.

(21) Appl. No.: 14/829,149

(22) Filed: Aug. 18, 2015

(65) Prior Publication Data
US 2017/0054188 A1    Feb. 23, 2017

(51) Int. Cl.
| H01M 10/50 | (2006.01) |
| H01M 10/663 | (2014.01) |
| B60H 1/00 | (2006.01) |
| H01M 10/613 | (2014.01) |
| H01M 10/625 | (2014.01) |

(52) U.S. Cl.
CPC ...... *H01M 10/663* (2015.04); *B60H 1/00385* (2013.01); *B60H 1/00899* (2013.01); *H01M 10/613* (2015.04); *H01M 10/625* (2015.04); *B60H 2001/00928* (2013.01); *H01M 2220/20* (2013.01)

(58) Field of Classification Search
CPC ............ B60H 1/00385; B60H 1/00835; B60H 1/00885; B60H 2001/00928; H01M 10/613; H01M 10/625; H01M 10/663; H01M 2220/20
See application file for complete search history.

(56) References Cited

U.S. PATENT DOCUMENTS

| 2012/0261110 A1 | 10/2012 | Katoh et al. | |
| 2014/0020415 A1 | 1/2014 | Heyl | |
| 2014/0026831 A1* | 1/2014 | Mahrs | F01P 7/04 123/41.05 |
| 2014/0041826 A1* | 2/2014 | Takeuchi | B60L 1/02 165/10 |
| 2015/0096313 A1 | 4/2015 | Ragazzi | |
| 2015/0115048 A1* | 4/2015 | Brodie | B60H 1/00764 237/2 B |

FOREIGN PATENT DOCUMENTS

JP    S61108009 A    5/1986

* cited by examiner

*Primary Examiner* — Patrick Ryan
*Assistant Examiner* — Ben Lewis
(74) *Attorney, Agent, or Firm* — David Kelley; Brooks Kushman, P.C.

(57) ABSTRACT

A vehicle includes a refrigerant system having an intermediary heat exchanger, an exterior heat exchanger, and an expansion device disposed therebetween. The vehicle also includes a coolant circuit having a pump configured to circulate coolant through the intermediary heat exchanger and an engine. A controller is programmed to, in response to air conditioning being requested and the coolant temperature exceeding a threshold temperature, open the expansion device and de-energize the pump to condense refrigerant in the exterior heat exchanger.

19 Claims, 7 Drawing Sheets

CLIMATE CONTROL SYSTEM FOR A VEHICLE

TECHNICAL FIELD

The present disclosure relates to a control strategy for operating the vehicle during an air conditioning mode.

BACKGROUND

The need to reduce fuel consumption and emissions in automobiles and other vehicles is well known. Vehicles are being developed that reduce reliance or completely eliminate reliance on internal-combustion engines. Electrified vehicles are one type of vehicle currently being developed for this purpose. In general, electrified vehicles differ from conventional motor vehicles in that they are selectively driven by one or more battery powered electric machines. Many electrified vehicles include thermal management systems that mange the thermal demands of various components during vehicle operation, including the vehicle's high-voltage fraction battery and the internal-combustion engine (if provided).

SUMMARY

According to one embodiment, a vehicle includes a refrigerant system having an intermediary heat exchanger, an exterior heat exchanger, and an expansion device disposed therebetween. The vehicle also includes a coolant circuit having a pump configured to circulate coolant through the intermediary heat exchanger and an engine. A controller is programmed to, in response to air conditioning being requested and the coolant temperature exceeding a threshold temperature, open the expansion device and de-energize the pump to condense refrigerant in the exterior heat exchanger.

According to another embodiment, a vehicle includes an engine and a traction battery electrically connected to at least one electric machine. A refrigerant system of the vehicle includes an exterior heat exchanger, an intermediary heat exchanger, an expansion device located between the heat exchangers, and a bypass loop having an inlet disposed between the heat exchangers and arranged to bypass the exterior heat exchanger. A coolant circuit of the vehicle includes a pump configured to circulate coolant through the engine and the intermediary heat exchanger. Grille shutters are disposed behind a front fascia of the vehicle and are disposed in front of the exterior heat exchanger. A controller is programmed to, in response to air conditioning being requested and a temperature of the coolant being less than a threshold temperature, close the expansion device such that refrigerant bypasses the exterior heat exchanger via the bypass loop, and energize the pump to transfer heat from the refrigerant system to the coolant circuit via the intermediary heat exchanger such that refrigerant is condensed in the intermediary heat exchanger.

According to yet another embodiment, a method of operating a vehicle climate control system is disclosed. The vehicle includes grille shutters and a heat exchanger in fluid communication with a refrigerant system and an engine cooling loop having coolant. The method includes, in response to air conditioning being requested and the coolant having a temperature less than a threshold temperature, transferring heat from the refrigerant system to the engine cooling loop via the heat exchanger, and closing the grille shutters.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
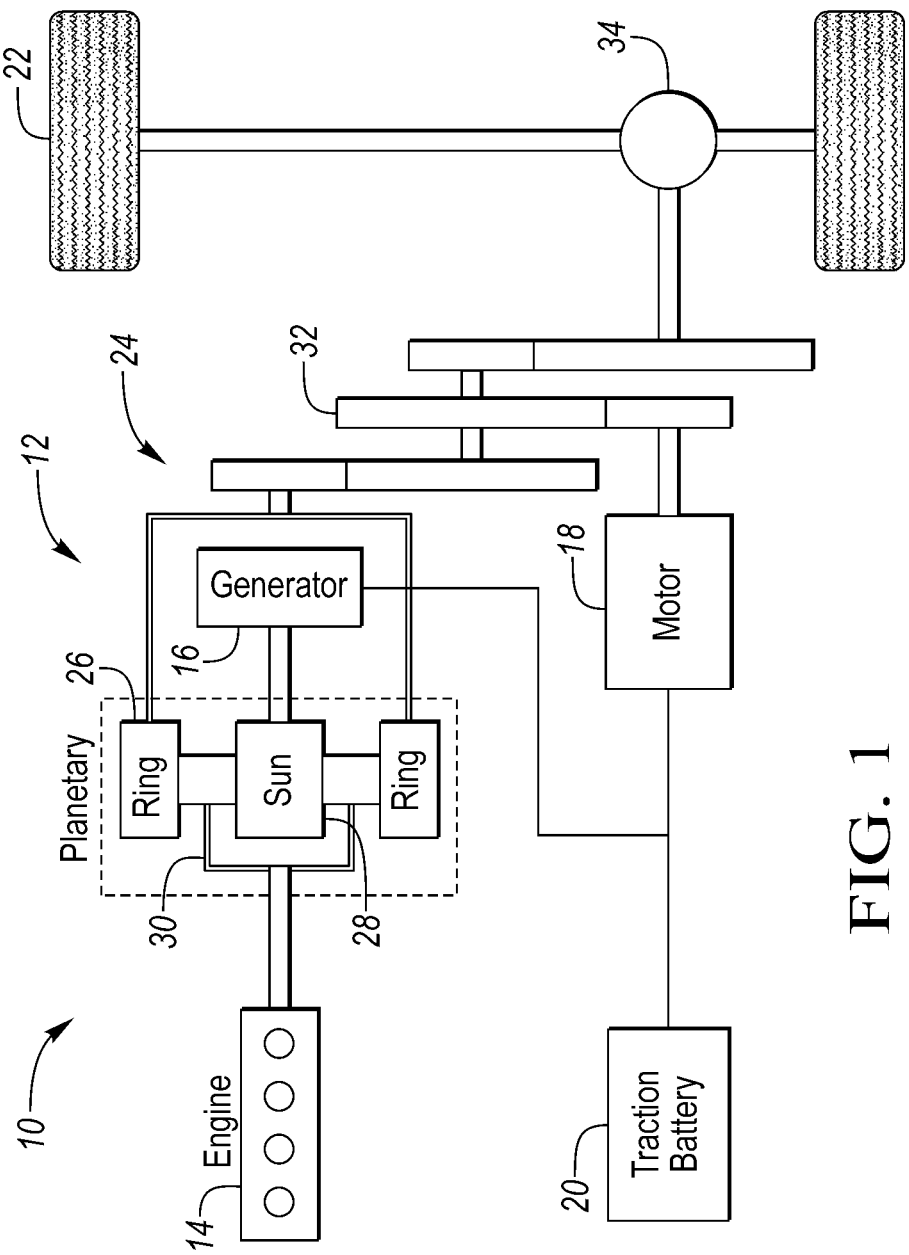
FIG. 1 is a schematic diagram of an example hybrid-electric vehicle.

FIG. 1 depicts a schematic of a typical plug-in hybrid-electric vehicle. Certain embodiments may also be implemented within the context of non-plug-in hybrid-electric vehicles. Referring to FIG. 1, a vehicle 10 includes a powertrain 12, such as a power-split powertrain including a first drive system and a second drive system. The first drive system includes an engine 14 and a first electric machine or generator 16. The second drive system includes a second electric machine or motor 18, the generator 16, and a traction battery assembly 20. The first and second drive systems generate torque to drive one or more of the vehicle driven wheels 22.

The engine 14, such as an internal-combustion engine, and the generator 16 may be connected through a power-transfer unit 24. The power transfer unit 24 may be a planetary gear set that includes a ring gear 26, a sun gear 28 and a carrier assembly 30. Other types of power-transfer units are contemplated by the present disclosure. The powertrain 12 may include additional gearing 32 for coupling the generator 16 to the motor 18 and for coupling the generator and/or the motor to the differential 34 to distribute torque to the wheels 22.

The vehicle 10 also includes a battery energy control module (BECM) for controlling the battery 20. The BECM receives input that is indicative of vehicle conditions and battery conditions, such as battery temperature, voltage and current. The BECM calculates and estimates battery parameters, such as battery state of charge and the battery power capability. The BECM provides output that is indicative of a battery state of charge (SOC) and a battery power capability to other vehicle systems and controllers.

The vehicle 10 includes a plurality of controllers for controlling the function of various components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, a reference to "a controller" refers to one or more controllers.

The hybrid-electric vehicle 10 may be operated in a plurality of different powertrain modes including charge-sustaining mode and charge-depleting mode (also known as EV mode). In charge-depleting mode, the battery is used as the primary source for propulsion until the battery SOC drops below a threshold SOC, at which point, the vehicle switches to charge-sustaining mode. Used herein, the term charge-depletion mode refers to modes where the engine may run periodically and to modes where the engine is not used. For example, the vehicle may include an EV-only mode (also known as EV now) where the engine is disabled.

Figure 2:
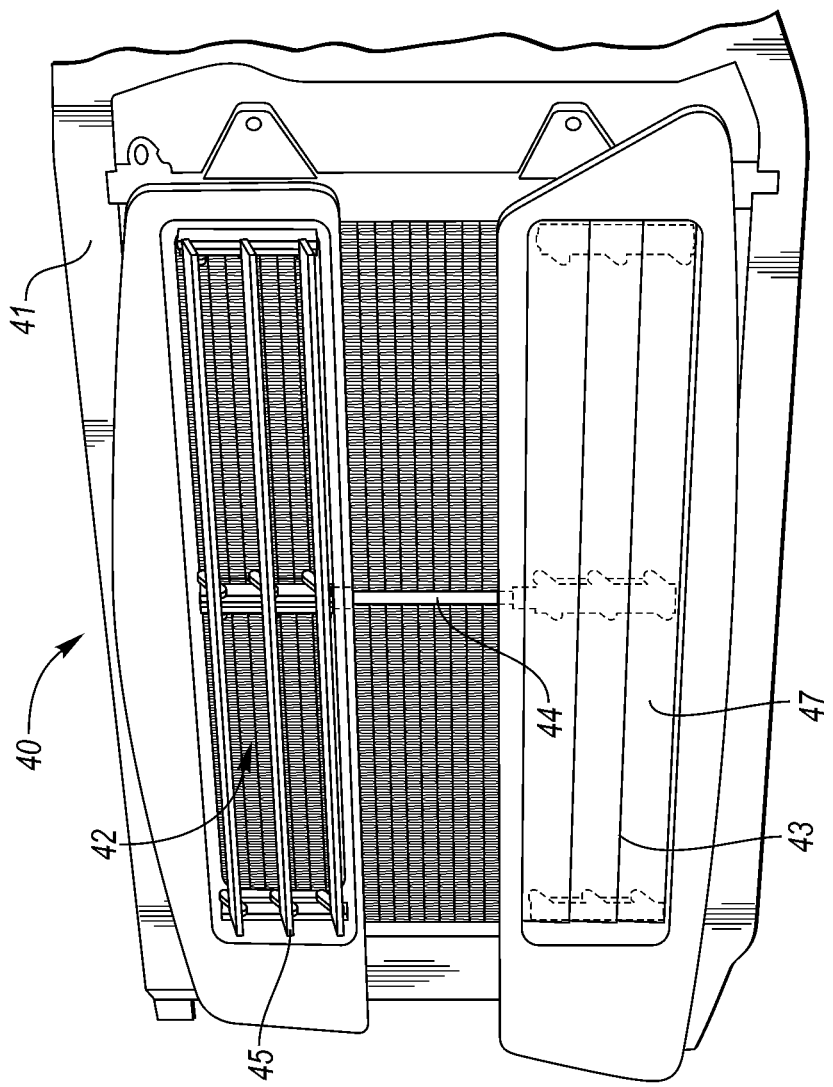
FIG. 2 is a perspective view of a grille-shutter assembly.

Referring to FIG. 2, the vehicle 10 includes a front fascia having a grille. A grille shutter-assembly 40 is disposed within the engine compartment behind the grille and in front of the engine 14. The shutter assembly 40 includes a housing 41 attached to one or more vehicle body structures behind the front fascia of the vehicle 10. The housing 41 defines at least one opening 42. A plurality of shutters 43 are pivotally attached to the housing 41 and are disposed in one or more of the openings 42. Each of the shutters 43 are movable between an open position, a closed position, and a plurality of intermediate positions via an actuator 44. The actuator 44 may include a motor that is electrically controlled by the controller. For illustrative purposes, the upper bank of shutters is shown in the open position and the lower bank of shutters is shown in the closed position. In some embodiments, the upper and lower banks of shutters operate dependently, and in other embodiments, the upper and lower banks operate independently. Each of the shutters 43 also includes a major side 47 and a minor side 45. When in the closed position, each of the shutters 43 are rotated such that the major sides 47 face the airstream to block air from entering through the openings 42. When in the open position, each of the shutters are rotated such that the minor sides 45 face the airstream allowing air to flow through the openings 42. The openings 42 and the shutters 43 cooperate to define an effective cross-sectional area through which air may pass. The size of the effective cross-sectional area can be increased or decreased by moving the shutters.

Figure 3:
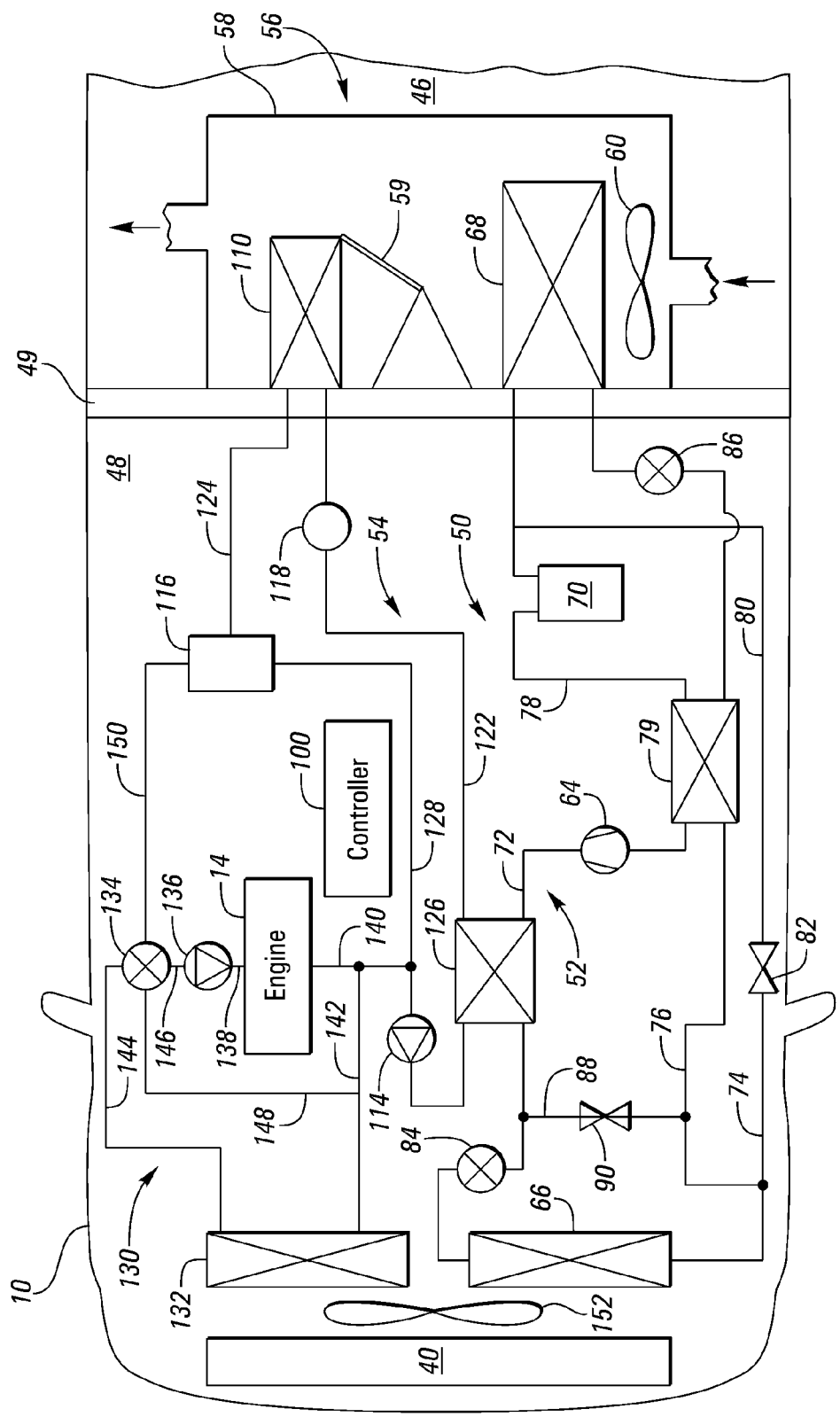
FIG. 3 is a schematic diagram illustrating various thermal management systems of the vehicle shown in FIG. 1.

The traction battery 24, the passenger cabin, and other vehicle components are thermally regulated with one or more thermal management systems. Example thermal management systems are shown in the figures and described below. Referring to FIG. 3, the vehicle 10 includes a cabin 46 and an engine compartment 48 that are separated by a bulkhead 49. Portions of the various thermal management systems may be located within the engine compartment, the cabin, or both. The vehicle 10 includes a climate control system 50 having a refrigerant subsystem 52, a cabin-heating subsystem or cabin loop 54, and a ventilation subsystem 56.

The ventilation subsystem 56 may be disposed within the dash of the cabin 46. The ventilation subsystem 56 includes an HVAC housing 58 having an air-inlet side and air-outlet side. The outlet side is connected to ducts that distribute exiting air into the cabin. A blower motor drives a fan (or cabin blower) 60 for circulating air in the ventilation system 56. A blend door 59 is disposed in the housing for controlling a temperature of the air exiting the housing 58. The vehicle 10 may also include a battery thermal management system (not shown) for regulating the temperature of the traction battery 20.

The refrigerant subsystem 52 is used to provide air conditioning of the cabin during some operating modes. The refrigerant subsystem 52 is also used to cool the battery 20 during some operating modes and is used to heat the battery during other operating modes. The refrigerant subsystem 52 may be a vapor-compression refrigerant subsystem that circulates a refrigerant transferring thermal energy to various components of the climate control system 50. The refrigerant subsystem 52 may include a cabin loop having a compressor 64, an exterior heat exchanger 66 (which is normally a condenser), an interior heat exchanger 68 (which is normally an evaporator), an accumulator 70, fittings, valves and expansion devices. The compressor may be an electronic compressor. The heat exchanger 66 may be located behind the grille shutters 40 near the front of the vehicle, and the evaporator 68 may be disposed within the housing 58. It is to be understood that heat exchangers labeled as "condenser" may also act as an evaporator in some modes. In one embodiment, the refrigerant subsystem 52 is a heat pump and may be used for both cooling and heating the cabin.

The cabin loop components are connected by a plurality of conduits, tubes, hoses or lines. For example, a first conduit 72 connects the compressor 64 and the heat exchanger 66 in fluid communication, a second conduit 74 connects the heat exchanger 66 to a valve 82, a third conduit 76 connects the heat exchanger 66 and the evaporator 68 in fluid communication, and a fourth conduit 78 connects the evaporator 68 and the compressor 64 in fluid communication. An evaporator bypass conduit 80 is connected between the valve 82 and conduit 78. The valve 82 may be a solenoid valve that can be opened and closed to supply refrigerant to either the conduit 76 or conduit 80 depending upon the operating mode of the refrigerant subsystem 52. For example, refrigerant is circulated into conduit 76 and not into conduit 80 when the air conditioning is ON. The valve 82 may be in communication with a controller 100. A heat exchanger 79 is arranged to transfer thermal energy between conduit 76 and conduit 78.

A first expansion device 84 may be disposed on conduit 72 and a second expansion device 86 may be disposed on conduit 76. The expansion devices are configured to change the pressure and temperature of the refrigerant in the refrigerant subsystem 52. The expansion devices may include an electronic actuator controlled by the controller 100. The controller 100 may instruct the actuator to position the expansion device in a wide-open position, a fully closed position, or a throttled position. The throttled position is a partially open position where the controller modulates the size of the valve opening to regulate flow through the expansion device. The controller 100 and expansion devices may be configured to continuously or periodically modulate the throttled position in response to system operating conditions. By changing the opening within the expansion device, the controller can regulate flow, pressure, temperature, and state of the refrigerant as needed. In alternative embodiments, a thermally-controlled expansion device (TXV), or fixed orifice tube with shut-off valves may be used in lieu of the electronically-controlled expansion devices.

The refrigerant subsystem 52 also includes a bypass loop 88 for bypassing the exterior heat exchanger 66. A bypass valve 90 is disposed on the bypass loop 88 and is actuatable to selectively allow refrigerant flow through the bypass loop 88. The valve 90 may be a solenoid valve that is electronically controlled by the controller 100. The valve 90 and the expansion device 84 cooperate to either circulate refrigerant through the exterior heat exchanger 66, or through the bypass loop 88. The refrigerant subsystem 52 may include a battery loop (not shown) having a another evaporator (commonly referred to as a chiller) and a third expansion device for thermally regulating the battery.

The cabin loop 54 includes a heater core 110, an auxiliary pump 114, valve 116, and conduit forming a closed loop for circulating coolant, such as an ethylene-glycol mixture. For example, coolant may be circulated from the auxiliary pump 114 to the heater core 110 via conduit 122. The heater core 110 is connected to the valve 116 via conduit 124. Valve 116 is connected to the pump 114 via conduit 128. The valve 116 may be a solenoid valve that is electronically controlled by the controller 100. A temperature sensor 118 may be disposed on conduit 122.

The engine 14 is thermally regulated by an engine-cooling loop 130 that is arranged to circulate coolant—such as an ethylene-glycol mixture—through the engine 14. The engine cooling loop 130 includes a radiator 132, thermostat 134, and an engine-coolant pump 136 (also known as a water pump) that are interconnected by plurality of conduits to form a coolant circuit. The engine loop 130 and the cabin loop 54 may be selectively interconnected to form a single coolant circuit during some operating modes and selectively disconnected to form separate coolant circuits during other modes.

The engine pump 136 may be connected to an inlet port of the engine 14 via conduit 138. The engine pump 136 may be powered by electricity supplied from the battery 20 or other current source. The outlet port of the engine 14 may be connected to conduit 128 of the cabin loop 54 via conduit 140. An inlet of the radiator 132 may be connected to conduit 140 via conduit 142. An outlet of the radiator 132 is connected to the thermostat 134 via conduit 144. The thermostat 134 is connected to the water pump 136 via conduit 146. The engine loop 130 also includes a radiator bypass 148. The thermostat 134 controls whether coolant is circulated to the radiator 132 or to the radiator bypass 148 depending upon a temperature of the coolant. Thermostat 134 may be electronically controlled or may be mechanically controlled. The thermostat 134 may be connected to the valve 116 via conduit 150. The illustrated arrangement of the engine loop 130 is merely an example and many other arrangements are contemplated by the present disclosure. In some embodiments, another temperature sensor may be disposed on line 140. Or the coolant temperature at line 140 may be inferred based on a temperature of the engine. The cabin loop 54 may also include an electric heater disposed on line 122.

The cabin loop 54 may exchange thermal energy with the refrigerant subsystem 52 via an intermediary heat exchanger 126, which is a refrigerant-to-coolant heat exchanger. The heat exchanger 126 may have any suitable configuration. For example, the heat exchanger 126 may have a plate-fin, tube-fin, or tube-and-shell configuration that facilitates the transfer of thermal energy without mixing the heat transfer fluids. The heat exchanger 126 may be connected to conduit 72 of the refrigerant subsystem 52 and connected to conduit 122 of the cabin loop 54. In some operating modes, the heat exchanger 126 may transfer thermal energy from the refrigerant subsystem 52 to the cabin loop 54 in order to heat the cabin 46. In other operating modes, the heat exchanger 126 may transfer thermal energy from the refrigerant subsystem 52 to the cabin loop 54 in order to heat the engine 14. In yet another operating mode, the heat exchanger 126 may act as a condenser during an air-conditioning mode and transfer heat from the refrigerant subsystem 52 to the cabin loop 54. The cabin loop 54 may include a by-pass line (not shown) to bypass the intermediary heat exchanger 126 when it is not desired to exchange heat between the cabin loop 54 and the refrigerant subsystem 52. The by-pass line may be controlled by a valve.

The climate control system 50 may operate in a plurality of different modes, which can be broken down into two main categories; heating and air conditioning. The climate control system 50 may operate in a plurality of different air-conditioning modes including a first AC mode and a second AC mode. The refrigerant subsystem 52 operates differently in the first and second AC modes.

In the first AC mode, the exterior heat exchanger 66 acts as a condenser and the interior heat exchanger 68 acts as an evaporator, which is typical of automotive refrigerant systems. In this mode, the compressor 64 pressurizes the refrigerant into a hot vapor that is circulated through an inactive intermediary heat exchanger 126 to the expansion device 84, which is in the fully open position. As the refrigerant passes through the heat exchanger 66 it condenses into a liquid state as heat is transferred from the refrigerant to the air passing through the heat exchanger 66. The valve 82 is in the closed position forcing the refrigerant to flow from the heat exchanger 66 to the second expansion device 86 via conduit 76. The expansion device 86 is in the throttled position. The expansion device 86 lowers the pressure and temperature of the refrigerant prior to entering the evaporator 68. The evaporator 68 extracts heat from air being circulated within the housing 58 to cool the cabin 46. The refrigerant then exits the evaporator 68, travels through the accumulator 70 and back to the compressor 64 for recirculation. In this mode, the bypass valve 90 is in the closed position forcing all of the refrigerant through the heat exchanger 66. In this mode, the pump 114 may be OFF and valve 116 may be positioned so that no coolant flow through heat exchanger 126 to avoid transferring heat from the cabin loop 54 to the refrigerant system 52.

Figure 4:
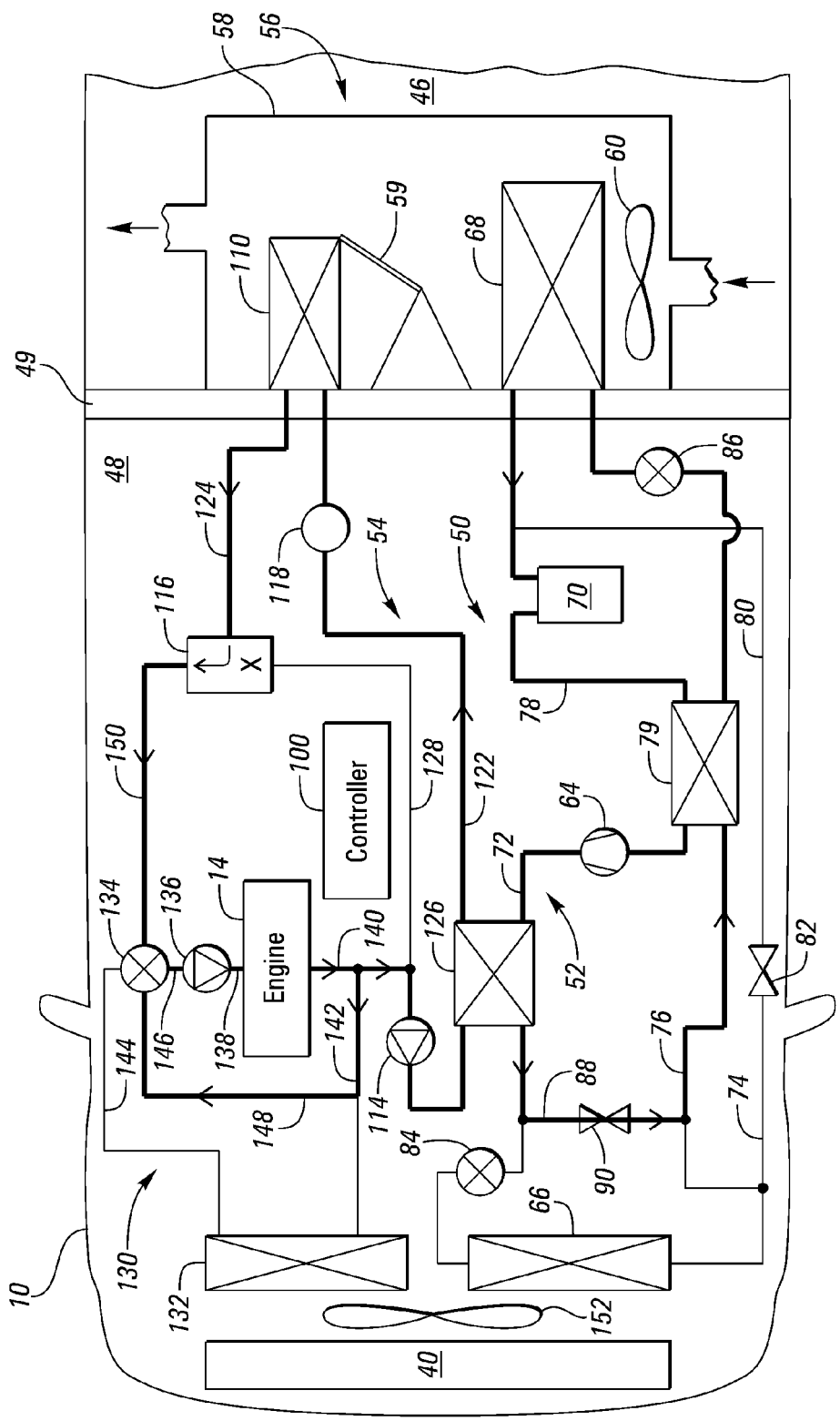
FIG. 4 is the schematic diagram of FIG. 3 shown in a second air-conditioning mode.

FIG. 4 illustrates the vehicle 10 operating in the second AC mode. The bold lines signify active conduits. When the temperature of the engine coolant is below a threshold temperature ($Temp_{TH}$), the climate control system 50 may operate in the second AC mode. PHEVs typically operate in a charge-depleting mode when first departing with a high battery SOC. The vehicle will continue in charge-depleting mode until the battery SOC drops below a threshold state of charge, at which point, the vehicle enters into a charge-sustaining mode. During a charge-depleting mode, the engine 14 is intermittently run, if at all. Thus, the coolant temperature typically remains below the threshold temperature until the vehicle switches to charge-sustaining mode. The second AC mode is typically available when the vehicle is in charge-depleting mode.

In this mode, the intermediary heat exchanger 126 is the condenser, the heat exchanger 68 is the evaporator, and the exterior heat exchanger 66 is inactive. The heat exchanger 126 transfers thermal energy from the refrigerant to the coolant, and not to the outside air like a traditional automotive condenser does. Because of this, air flow is not required within the engine bay 48. Thus, the grille shutters 40 may be closed and the engine-cooling fan 152 may be OFF. Closing the grille shutters 40 increases the aerodynamics of the vehicle providing better fuel efficiency and electric range. De-energizing the fan 152 reduces current draw on the traction battery 20 and increases battery range. This combination of improved aerodynamics and reduced current draw helps increase the electric range of the vehicle 10. This also pre-heats the engine and other components increasing efficiency at engine start up, which increases fuel economy.

In the second AC mode, the compressor 64 pressurizes the refrigerant into a hot vapor that is circulated through an active intermediary heat exchanger 126 that is operating as a condenser. The expansion valve 84 is closed and the bypass valve 90 is open causing the refrigerant to circulate through the bypass line 88 skipping the exterior heat exchanger 66. The refrigerant is then circulated through conduit 76 to the evaporator 68. The refrigerant passing through the evaporator 68 evaporates and extracts heat from the air passing with in the housing 58 to cool the cabin. The refrigerant is returned to the compressor 64 via conduit 78 for recirculation.

The valve 116 is actuated such that the cabin loop 54 and the engine loop 130 form a single coolant circuit. Coolant within the cabin loop 54 and the engine loop 130 is circulated through the heat exchanger 126 to extract heat from the refrigerant subsystem 52 in order to condense the refrigerant. Either or both of the pumps 114 and 136 may be energized to drive the coolant. For example, both the auxiliary pump 114 and the engine pump 136 are energized to circulate coolant through the heat exchanger 126 and to the heater core 110 via conduit 122. In some embodiments, a heater core bypass line may be provided. From the heater core 110, coolant is circulated to the valve 116 via conduit 124. The valve 116 is actuated to circulate coolant from conduit 124 to the thermostat via conduit 150. The coolant then circulates into the engine pump 136 via conduit 146. The engine pump 136 circulates the coolant through water jackets within the engine 14 and out an outlet port of the engine to conduit 140. Conduit 140 includes a fitting arranged to circulate a portion of the coolant into conduit 142 and a portion of the coolant to conduit 128 of the cabin loop 54. A much larger portion of the coolant may be circulated to conduit 128 than to conduit 142. The portion circulated to 128 is circulated to the pump 114 for recirculation. Conduit 142 is connected to the radiator 132 and is connected to conduit 148. In some embodiments, conduit 148 is connected to conduit 140 instead. The thermostat 134 is closed because the opening temperature for the thermostat is greater than or equal to the threshold temperature. The threshold temperature may be 25 to 50 degrees Celsius (C). Because the thermostat 134 is closed, the radiator 132 is inactive and any coolant in conduit 142 is circulated through conduit 148 and back to the engine pump 136.

Unlike a traditional AC operation, where passing air is used as a condensing medium, during the second AC mode, the engine coolant is used as the condensing medium. The engine 14 is a large heat sink that can absorb a fairly high amount of thermal energy. Depending upon the size and materials of the engine 14, the coolant loop may be used as the condensing medium for a fair amount of time before the temperature of the coolant exceeds the threshold temperature. When the coolant temperature exceeds the threshold temperature the climate control system must switch to the first AC mode because the coolant temperature is too hot to properly condense the refrigerant in the refrigerant subsystem 52, therefore decreasing the efficiency and capacity of the refrigerant subsystem.

Figure 5:
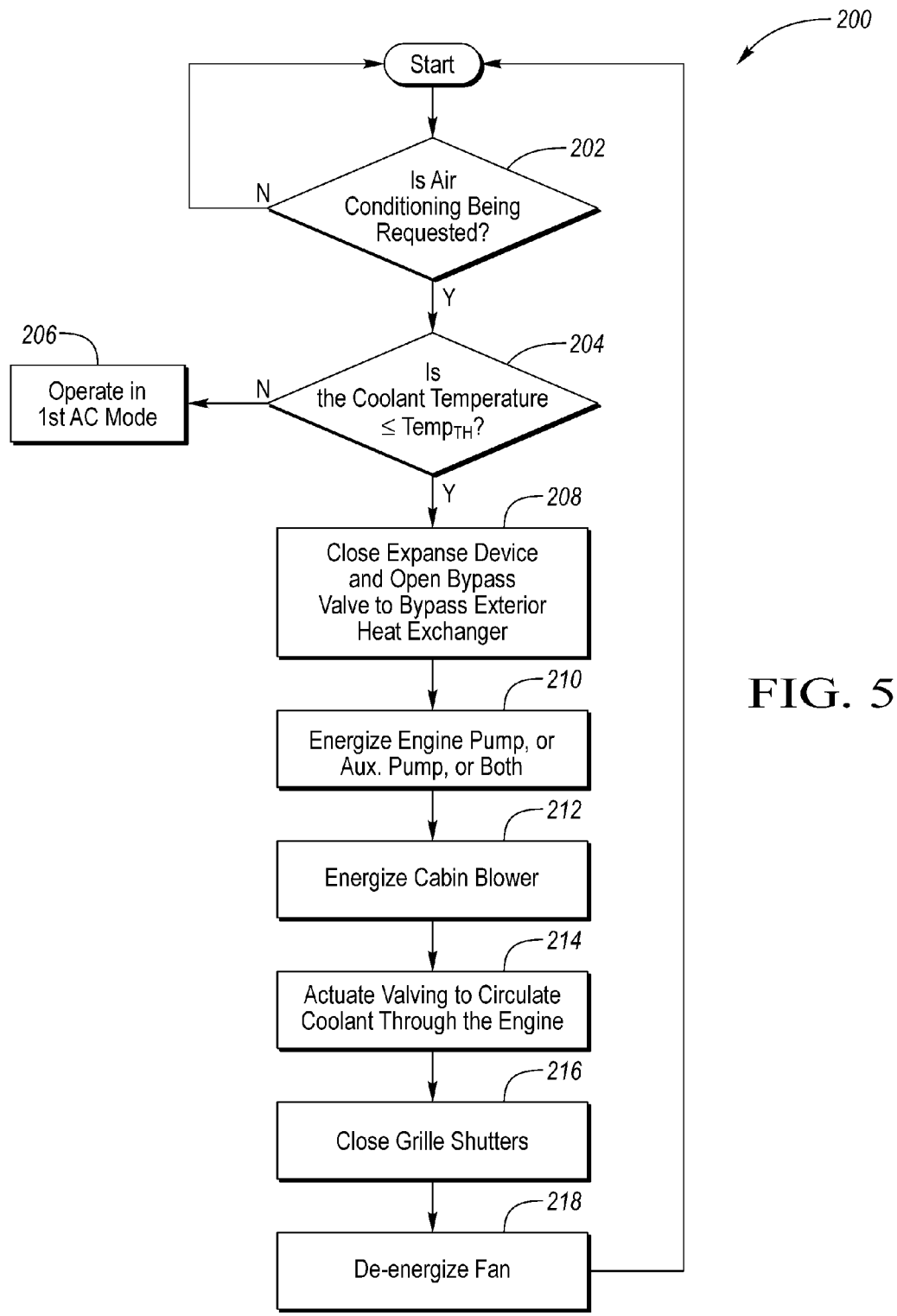
FIG. 5 is a control strategy for choosing between a first or second air-conditioning mode of the vehicle.

FIG. 5 illustrates a control strategy 200 for choosing between the first AC operating mode and the second AC operating mode. At operation 202 the controller determines if air conditioning is being requested. If no, control passes back to the start. If yes, control passes to operation 204, and the controller determines if the coolant temperature is less than or equal to the threshold temperature. If the coolant temperature is above the threshold temperature, control passes to operation 206 and the climate control system operates in the first AC mode. If the coolant temperature is less than or equal to the threshold temperature, the climate control system 50 may operate in the second AC mode. In operation 208 the controller instructs the expansion device 84 to the closed position and instructs the bypass valve 90 to the open position. When the expansion device 84 and the valve are actuated this way, refrigerant bypasses the exterior heat exchanger 66 and flows from conduit 72 to conduit 76 via bypass line 88. At operation 210 the controller sends a signal energizing the engine pump 136, the auxiliary pump 114 or both to circulate coolant through the heat exchanger 126. At operation 212 the controller sends a signal energizing the cabin blower 60 to circulate cool air into the cabin 46. At operation 214 the controller sends a signal actuating the valve 116 such that coolant is circulated from the heater core to the engine 14. At operation 216 the controller sends a signal instructing the grille shutters 40 to the closed position to improve the aerodynamics of the vehicle. At operation 218 the controller sends a signal to de-energizing the fan 152.

Figure 6:
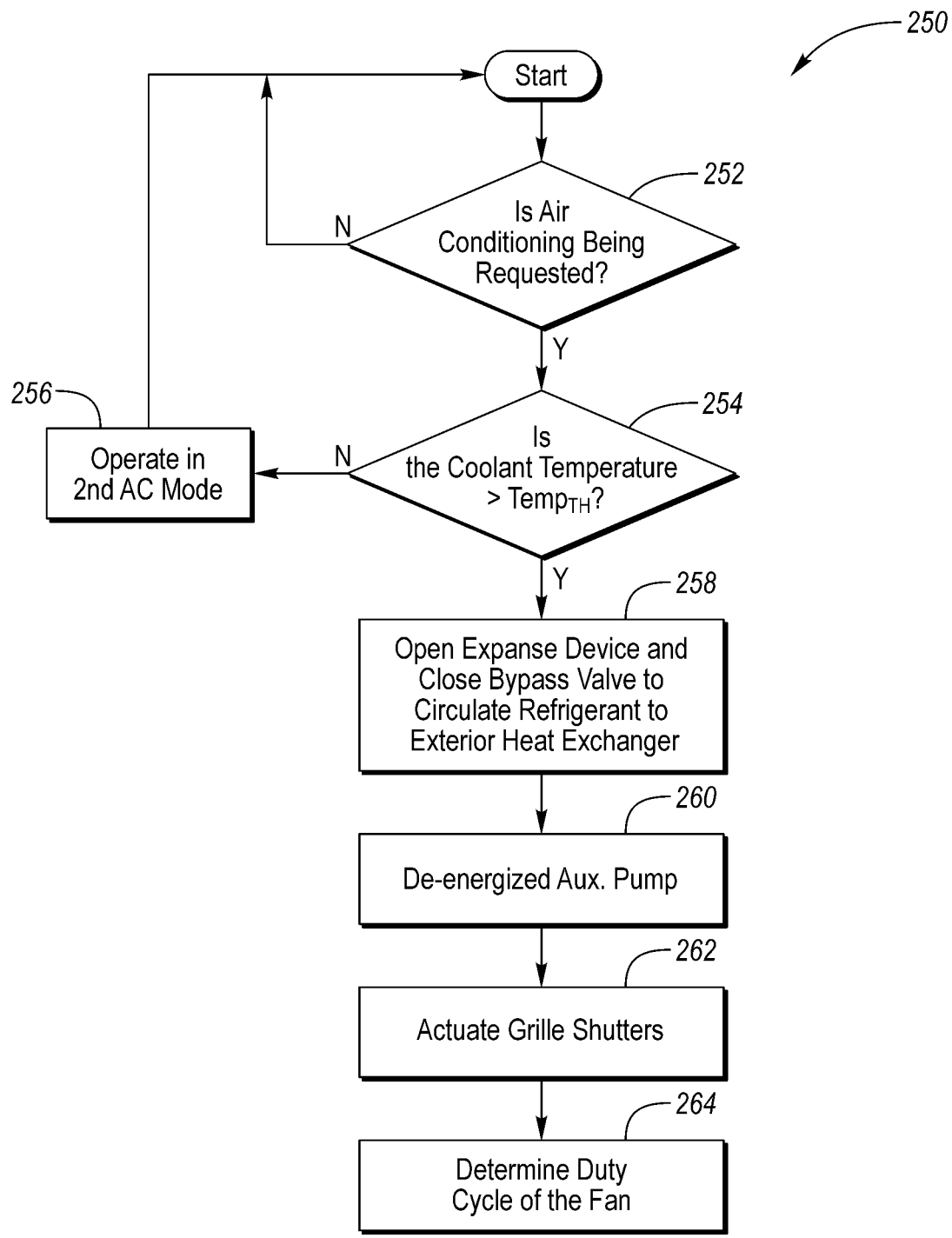
FIG. 6 is a control strategy for switching from the second air-conditioning mode to the first air-conditioning mode.

FIG. 6 illustrates a control strategy 250 for switching from the second AC mode to the first AC mode. At operation 252 the controller determines if air conditioning is being requested. If air conditioning is being requested control passes operation 254 and the controller determines if the coolant temperature is greater than the threshold temperature. If no, the vehicle continues to operate in the second AC mode. If yes, control passes to operation 258 and the controller sends a signal instructing the expansion device 84 to a wide-open position and the bypass valve 90 is instructed to a closed position to circulate the refrigerant to the exterior heat exchanger 66. At operation 260 the controller sends a signal to de-energize the auxiliary pump 114 and close valve 116 to stop the circulation of coolant through heat exchanger 126. The controller determines a position of the grille shutter 40 at operation 262 and determines a duty cycle of the fan 152 at operation 264.

Figure 7:
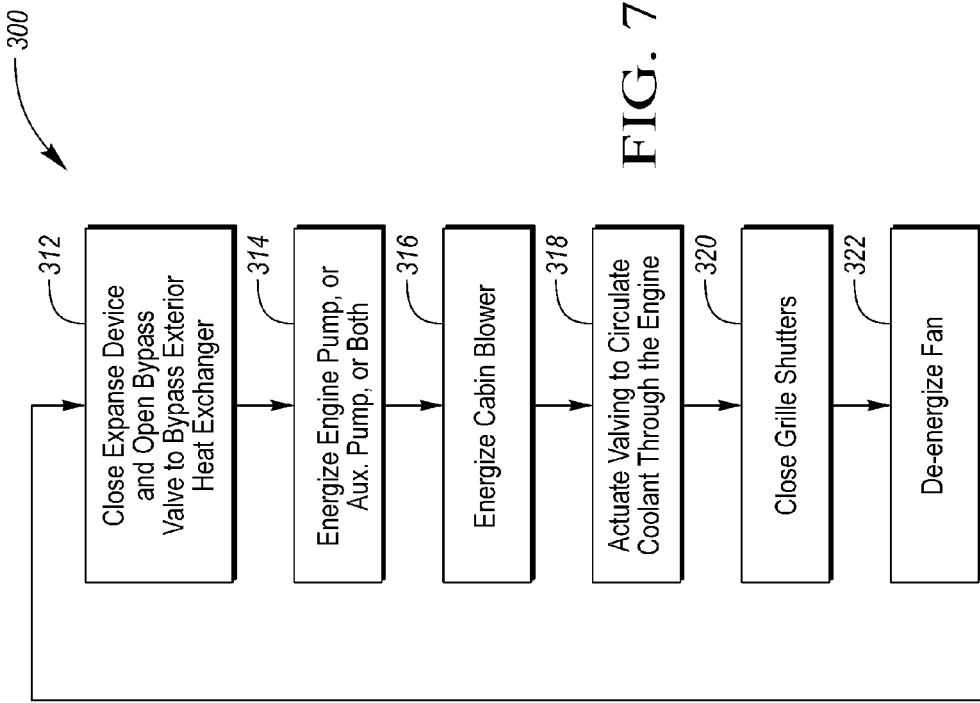
FIG. 7 is another control strategy for choosing between a first or second air-conditioning mode of the vehicle.
Figure 7:
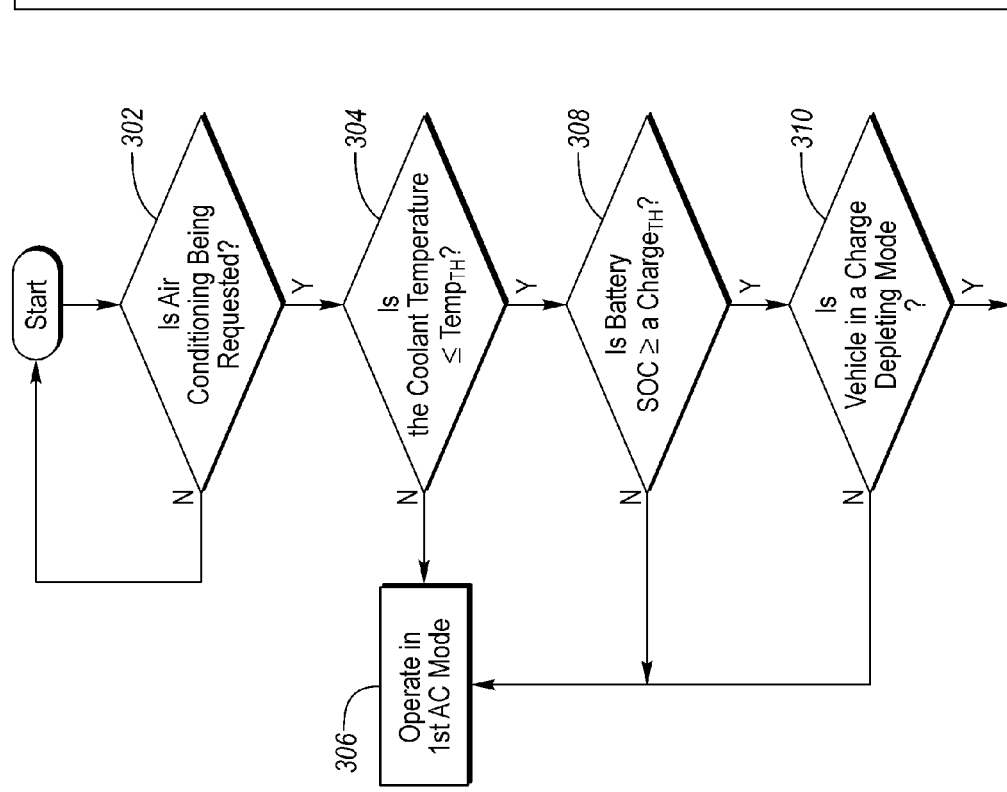

FIG. 7 illustrates another control strategy 300 for choosing between the first AC operating mode and the second AC operating mode. At operation 302 the controller determines if air conditioning is being requested. If no, control passes back to the start. If yes, control passes to operation 304, and the controller determines if the coolant temperature is less than or equal to the threshold temperature. If the coolant temperature is above the threshold temperature, control passes to operation 306 and the climate control system 50 operates in the first AC mode. If the coolant temperature is less than or equal to the threshold temperature, control passes to operation 308. At operation 308 the controller determines if the battery SOC is greater than or equal to a threshold charge (Charge$_{TH}$). If no, control passes to operation 306 and the system operates in the 1st AC mode. If yes, control passes operation 310 and the controller determines if the vehicle is in a charge-depleting mode. If the vehicle is not operating in a charge-depleting mode, control passes to operation 306. If the vehicle is in a charge-depleting mode, the climate control system 50 may operate in the second AC mode and control passes operation 312. At operation 312 the controller instructs the expansion device 84 to the closed position and instructs the bypass valve 90 to the open position. When the expansion device 84 and the valve are actuated this way, refrigerant bypasses the exterior heat exchanger 66 and flows from conduit 72 to conduit 76 via bypass line 88. At operation 314 the controller energizes the water pump 136, the auxiliary pump 114 or both to circulate coolant through the heat exchanger 126. At operation 316 the controller sends a signal energizing the cabin blower 60 to circulate cool air into the cabin 46. At operation 318 the valve 116 is actuated such that coolant is circulated from the heater core 110 to the engine 14. At operation 320 the controller sends a signal instructing the grille shutters 40 to the closed position to improve the aerodynamics of the vehicle. At operation 322 the controller sends a signal to de-energizing the fan 152. The control strategies were described with reference to the vehicle layout shown in FIGS. 3 and 4. However, the control strategies are equally applicable to other layouts.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an engine;
a fraction battery electrically connected to at least one electric machine;
a refrigerant system including an exterior heat exchanger, an intermediary heat exchanger, an expansion device located between the heat exchangers, and a bypass loop having an inlet disposed between the heat exchangers and arranged to bypass the exterior heat exchanger;
a coolant circuit including a pump configured to circulate coolant through the engine and the intermediary heat exchanger;
grille shutters disposed behind a front fascia of the vehicle and disposed in front of the exterior heat exchanger; and
a controller programmed to, in response to air conditioning being requested and a temperature of the coolant being less than a threshold temperature, close the expansion device such that refrigerant bypasses the exterior heat exchanger via the bypass loop, and energize the pump to transfer heat from the refrigerant system to the coolant circuit via the intermediary heat exchanger such that refrigerant is condensed in the intermediary heat exchanger.

2. The vehicle of claim 1 wherein the controller is further programmed to request the grille shutters to close.

3. The vehicle of claim 1 wherein the controller is further programmed to perform the closing and the energizing in response to a battery state of charge being higher than a threshold charge.

4. The vehicle of claim 3 wherein the controller is further programmed to perform the closing and the energizing in response to the vehicle being in a charge-depletion mode.

5. The vehicle of claim 1 wherein the controller is further programmed to perform the closing and the energizing in response to the battery being in a charge-depletion mode.

6. The vehicle of claim 1 further comprising a fan disposed behind the grille shutters, wherein the controller is further programmed to delay energizing the fan at least until the temperature exceeds the threshold temperature.

7. The vehicle of claim 1 wherein the coolant circuit further includes a valve, and wherein the controller is further programmed to, in response to the temperature exceeding the threshold temperature, open the expansion device, de-energize the pump, and close the valve to condense refrigerant in the exterior heat exchanger.

8. The vehicle of claim 7 wherein the controller is further programmed to open the grille shutters.

9. A vehicle comprising:
a refrigerant system including an intermediary heat exchanger, an exterior heat exchanger, and an expansion device disposed therebetween;
a coolant circuit including a pump configured to circulate coolant through the intermediary heat exchanger and an engine; and
a controller programmed to, in response to air conditioning being requested and the coolant exceeding a threshold temperature, open the expansion device and de-energize the pump to condense refrigerant in the exterior heat exchanger.

10. The vehicle of claim 9 further comprising grille shutters disposed behind a front fascia of the vehicle and including an actuator configured to change a position of the grille shutters, wherein the controller is further programmed to send a signal to the actuator instructing the grille shutters to an open position.

11. The vehicle of claim 9 further comprising a fan disposed adjacent to the exterior heat exchanger, wherein the controller is further programmed to energize the fan.

12. The vehicle of claim 9 wherein the refrigerant system further includes a compressor, a bypass loop having an inlet disposed between the compressor and the heat exterior exchangers, an outlet connected to a conduit downstream of the exterior heat exchanger, and a valve actuatable to circulate refrigerant around the exterior heat exchanger, wherein the controller is further programmed to close the valve.

13. The vehicle of claim 9 further comprising a traction battery electrically connected to at least one electric machine that is configured to selectively provide torque to driven wheels of the vehicle.

14. A method of operating a vehicle climate control system including grille shutters and a heat exchanger in fluid communication with a refrigerant system and an engine cooling loop having coolant, the method comprising:

in response to air conditioning being requested and the coolant having a temperature less than a threshold temperature, transferring heat from the refrigerant system to the engine cooling loop via the heat exchanger, and closing the grille shutters.

15. The method of claim 14 further comprising condensing refrigerant in the heat exchanger.

16. The method of claim 14 wherein the climate control system further includes a fan disposed behind the grille shutters and the method further includes delaying activation of the fan at least until the temperature exceeds the threshold temperature.

17. The method claim 14 wherein the climate control system further includes an exterior heat exchanger disposed behind the grille shutters and an expansion device disposed on a conduit extending between the heat exchanger and the exterior heat exchanger, and wherein the method further comprises closing the expansion device.

18. The method of claim 17 further comprising, in response to the temperature exceeding the threshold temperature, opening the expansion device.

19. The method of claim 18 further comprising condensing refrigerant in the exterior heat exchanger.

* * * * *